(12) United States Patent
Knaack (10) Patent No.: US 9,103,231 B2
(45) Date of Patent: Aug. 11, 2015

(54) BEARING SUPPORT FOR A TURBOCHARGER

(75) Inventor: Russell Adam Knaack, Homer Glen, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 575 days.

(21) Appl. No.: 13/536,080

(22) Filed: Jun. 28, 2012

(65) Prior Publication Data
US 2014/0003912 A1 Jan. 2, 2014

(51) Int. Cl.
| F01D 25/18 | (2006.01) |
| F01D 25/16 | (2006.01) |
| F01D 25/24 | (2006.01) |
| F02C 6/12 | (2006.01) |
| F02C 7/06 | (2006.01) |

(52) U.S. Cl.
CPC .............. *F01D 25/162* (2013.01); *F01D 25/18* (2013.01); *F01D 25/243* (2013.01); *F02C 6/12* (2013.01); *F02C 7/06* (2013.01); *F05D 2230/64* (2013.01); *F05D 2240/40* (2013.01); *F05D 2260/30* (2013.01); *F05D 2260/40311* (2013.01); *F05D 2260/98* (2013.01)

(58) Field of Classification Search
CPC ....... F01D 25/18; F01D 25/25; F01D 25/243; F01D 25/162; F05D 2260/98
See application file for complete search history.

(56) References Cited

U.S. PATENT DOCUMENTS

| 3,667,214 A | 6/1972 | Addie |
| 4,287,791 A * | 9/1981 | Numazawa et al. .......... 475/206 |
| 4,445,337 A | 5/1984 | McCreary |
| 4,460,284 A | 7/1984 | Lauterbach et al. |
| 4,486,147 A | 12/1984 | Byrne et al. |
| 5,145,334 A | 9/1992 | Gutknecht |
| 5,224,459 A | 7/1993 | Middlebrook |
| 5,246,352 A | 9/1993 | Kawakami |
| 5,392,604 A | 2/1995 | Nikula et al. |
| 5,544,486 A | 8/1996 | Lu |
| 6,264,424 B1 | 7/2001 | Fuller |
| 6,449,950 B1 * | 9/2002 | Allen et al. ..................... 60/607 |
| 6,478,469 B1 | 11/2002 | Jones |
| 7,025,579 B2 | 4/2006 | Woollenweber et al. |
| 7,043,915 B2 | 5/2006 | Anello |
| 7,469,689 B1 | 12/2008 | Jones et al. |
| 7,793,499 B2 | 9/2010 | Gutknecht |
| 8,028,524 B2 | 10/2011 | Middlebrook et al. |
| 2001/0050168 A1 | 12/2001 | Hult |
| 2002/0141862 A1 | 10/2002 | McEwen |

FOREIGN PATENT DOCUMENTS

CN 102324822 1/2012

OTHER PUBLICATIONS

Co-pending U.S. Patent Application entitled "Turbocharger Support Housing Having Alignment Features," filed May 31, 2012 (17 pages).

* cited by examiner

*Primary Examiner* — Ninh H Nguyen
(74) *Attorney, Agent, or Firm* — Finnegan, Henderson, Farabow, Garrett & Dunner, LLP (57) ABSTRACT

A bearing support for a turbocharger assembly is provided. The bearing support may include a cylindrical body with a tip end, a base end, and a conical outer surface extending from the tip end to the base end. The bearing support may also include an annular protrusion extending from the base end in a direction away from the tip end, and a stepped bore formed within the cylindrical body and passing from the tip end through the annular protrusion. The bearing support may also include a first conduit disposed within the cylindrical body and extending from an intersection of the annular protrusion and the base end of the cylindrical body toward the tip end.

19 Claims, 6 Drawing Sheets

BEARING SUPPORT FOR A TURBOCHARGER

TECHNICAL FIELD

The present disclosure is directed to a bearing support and, more particularly, to a bearing support for a turbocharger.

BACKGROUND

Internal combustion engines such as, for example, diesel engines, gasoline engines, and gaseous fuel powered engines are supplied with a mixture of air and fuel for subsequent combustion within the engines that generates a mechanical power output. In order to increase the power generated by this combustion process, each engine can be equipped with a turbocharged air induction system.

A turbocharged air induction system includes a turbocharger that uses exhaust from the engine to compress air flowing into the engine, thereby forcing more air into a combustion chamber of the engine than could otherwise be drawn into the combustion chamber. This increased supply of air allows for increased fueling, resulting in an increased power output. A turbocharged engine typically produces more power than the same engine without turbocharging. An exemplary turbocharged engine is disclosed in U.S. Pat. No. 3,667,214 ("the '214 patent") of Addie that issued on Jun. 6, 1972.

A conventional turbocharger includes rotating parts such as turbine wheels located within a common support housing. Precise alignment is required between the support housing and the rotating shafts or wheels to prevent premature or excessive wear and damage of the components. Over time, if the support housing is misaligned relative to the rotating components by even fractions of an inch, excessive friction and stress between the rotating parts can occur and lead to component failure. Conventional mechanisms for alignment utilize dowel pins, alignment gauges, and tedious assembly processes. However, these techniques require operators with extensive training, are time-intensive, and are subject to operator error.

The bearing support of the present disclosure solves one or more of the problems set forth above and/or other problems of the prior art.

SUMMARY

In one aspect, the disclosure is directed to a bearing support for a turbocharger assembly. The bearing support may include a cylindrical body with a tip end, a base end, and a conical outer surface extending from the tip end to the base end. The bearing support may also include an annular protrusion extending from the base end in a direction away from the tip end, and a stepped bore formed within the cylindrical body and passing from the tip end through the annular protrusion. The bearing support may also include a first conduit disposed within the cylindrical body and extending from an intersection of the annular protrusion and the base end of the cylindrical body toward the tip end.

In another aspect, the disclosure is directed to a bearing support for a turbocharger assembly. The bearing support may include a cylindrical body with a tip end, a base end, and a conical outer surface extending from the tip end to the base end. The bearing support may also include a stepped bore formed within the cylindrical body and passing from the tip end to the base end, and an annular protrusion extending from the base end in a direction away from the tip end. The bearing support may also include a plurality of asymmetrically arranged mounting holes disposed within the base end.

DETAILED DESCRIPTION

Figure 1:
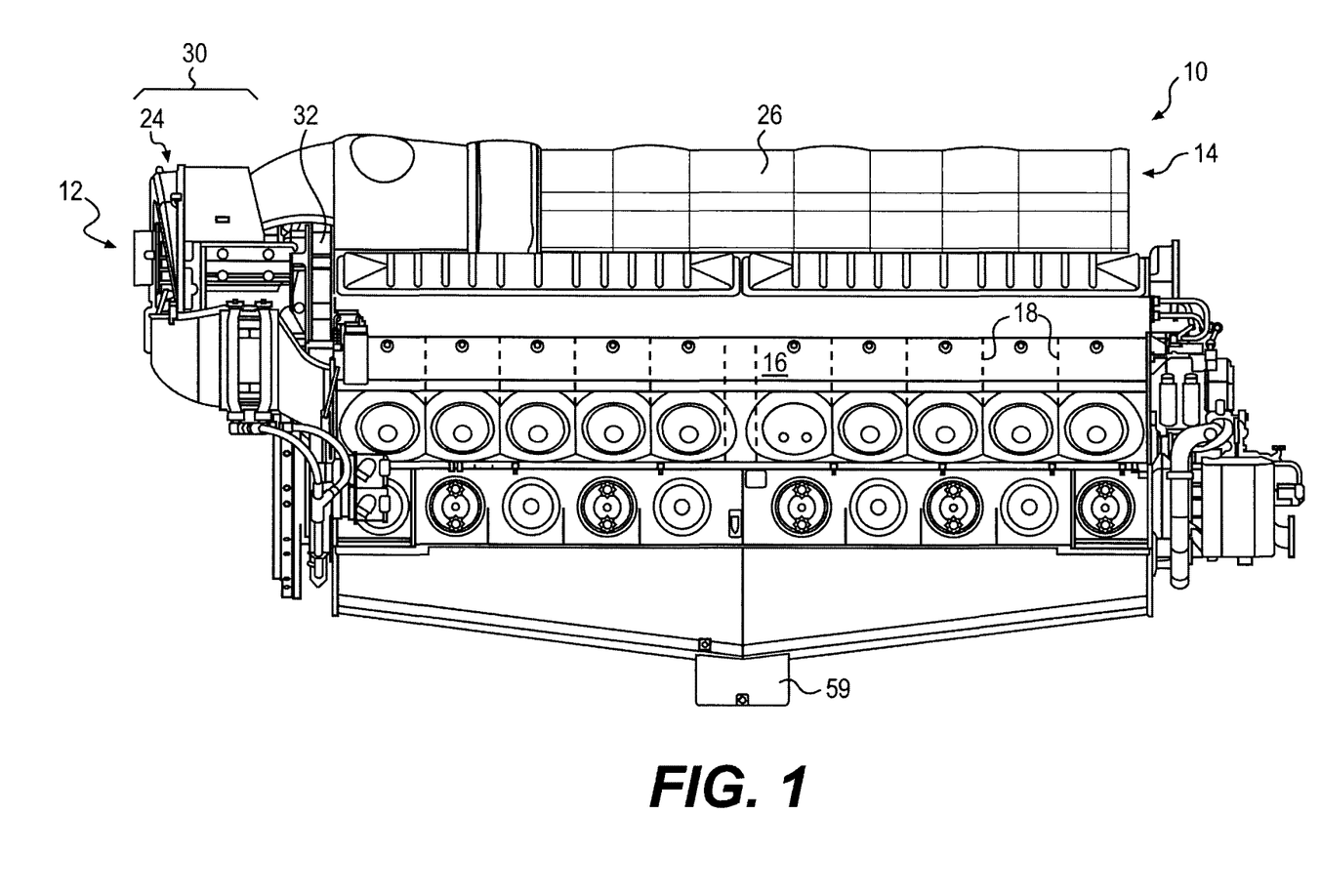
FIG. 1 is a pictorial illustration of an exemplary disclosed engine.

FIG. 1 illustrates an engine 10 equipped with an air induction system 12 and an exhaust system 14. For the purposes of this disclosure, engine 10 is depicted and described as a two-stroke diesel engine. One skilled in the art will recognize, however, that engine 10 may be another type of internal combustion engine such as, for example, a two- or four-stroke gasoline or gaseous fuel-powered engine. Engine 10 may include an engine block 16 that at least partially defines a plurality of cylinders 18. A piston (not shown) may be slidably disposed within each cylinder 18 to reciprocate between a top-dead-center position and a bottom-dead-center position, and a cylinder head (not shown) may be associated with each cylinder 18.

Cylinder 18, the piston, and the cylinder head may form a combustion chamber. In the illustrated embodiment, engine 10 includes twenty such combustion chambers arranged in two separate banks (only one shown in FIG. 1). However, it is contemplated that engine 10 may include a greater or lesser number of combustion chambers and that the combustion chambers may be disposed in an "in-line" configuration, in a "V" configuration, in an opposing-piston configuration, or in any other suitable configuration.

Air induction system 12 may include components configured to introduce charged air into the combustion chambers of engine 10. For example, air induction system 12 may include an induction manifold (not shown—located between the opposing banks of combustion chambers) fluidly connected along its length to the combustion chambers, one or more compressors 24 in fluid communication with an end of the induction manifold and, in some embodiments, an air cooler located downstream of compressors 24 and upstream of the combustion chambers. It is contemplated that additional components may be included within air induction system 12, if desired, such as valving, one or more air cleaners, one or more waste gates, a control system, a bypass circuit, and other means for introducing charged air into engine 10. It is also contemplated that the air cooler may be omitted, if desired.

Each compressor 24 of engine 10 may embody a fixed-geometry centrifugal-type compressor that is mechanically driven to compress air flowing into engine 10 to a predetermined pressure level. It should be noted that compressor 24 may be integrally connected to a turbine 28 that is driven by exhaust flow. Compressors 24, if more than one is included within air induction system 12, may be disposed in a series or parallel relationship and fluidly connected to engine 10 via the induction manifold.

Exhaust system 14 may be configured to recuperate energy from the exhaust flowing out of the combustion chambers of engine 10. For example, exhaust system 14 may include an exhaust manifold 26 fluidly connected along its length to the combustion chambers of engine 10, and one or more turbines 28 in fluid communication with an end of exhaust manifold 26. Turbines 28, if more than one is included within exhaust system 14, may be connected in a series or parallel relationship.

Each turbine 28 of exhaust system 14 may be mechanically connected to one or more compressors 24 of air induction system 12 to form a turbocharger 30. Turbocharger 30 may be mounted to engine 10 by way of a support housing 32. As the hot exhaust gases exiting engine 10 move through exhaust manifold 26 into turbine 28 and expand against blades thereof, turbine 28 may rotate and drive the connected compressors 24 to compress inlet air directed to the combustion chambers of engine 10 via the induction manifold.

Figure 2:
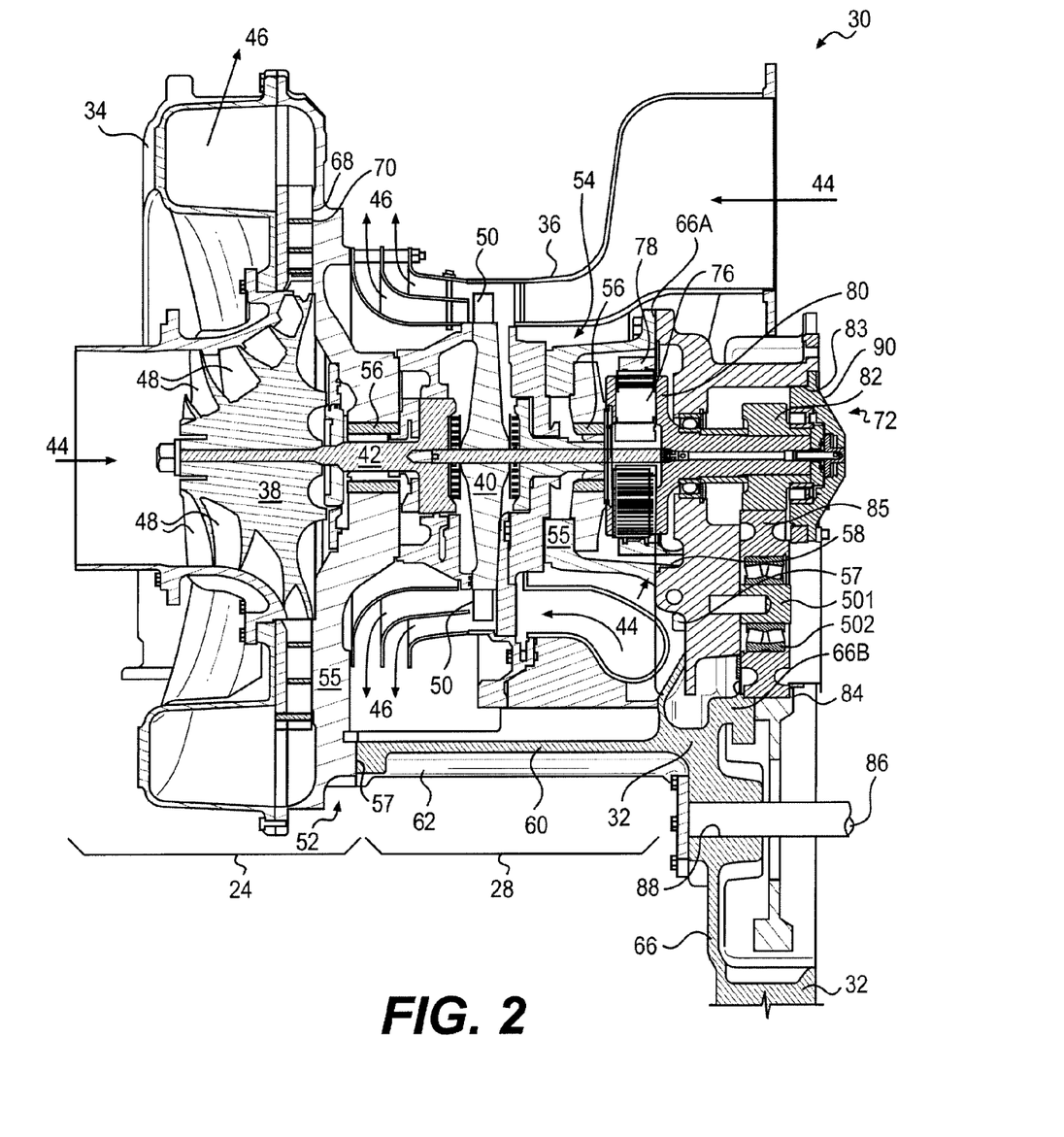
FIG. 2 is a cross-sectional illustration of an exemplary disclosed turbocharger that may be used in conjunction with the engine of FIG. 1.

As illustrated in FIG. 2, compressor 24 and turbine 28 may each include an associated shroud 34, 36 configured to house corresponding compressor and turbine wheels 38, 40 that are connected to each other via a common shaft 42. Each shroud 34, 36 may generally include an inlet 44 and an outlet 46. In the disclosed embodiment, inlets 44 are axially oriented and outlets 46 are radially oriented, although other configurations may also be possible. As compressor wheel 38 is rotated, air may be drawn axially in toward a center of compressor wheel 38. Blades 48 of compressor wheel 38 may then push the air radially outward in a spiraling fashion into the induction manifold (referring to FIG. 1). Similarly, as exhaust from exhaust manifold 26 is directed axially inward to turbine wheel 40, the exhaust may push against blades 50 of turbine wheel 40, causing turbine wheel 40 to rotate and drive compressor wheel 38 via shaft 42. After passing through turbine wheel 40, the exhaust may spiral radially outward through outlet 46 into the atmosphere. Compressor and turbine wheels 38, 40 may embody conventional wheels, with any number and configuration of blades 48, 50 radially disposed on a pressure face of corresponding wheel bases.

Each turbocharger 30 may include a bearing housing 52, 54 that connects compressor 24 and turbine 28 to support housing 32, respectively. Each of bearing housings 52, 54 may include a hollow, generally cylindrical body 55 having a mounting flange 57 located at one end that is configured to engage support housing 32. Cylindrical body 55 of bearing housings 52, 54 may be configured to support the corresponding compressor or turbine wheels 38, 40 at opposing ends of shaft 42 via one or more bearings 56.

Oil that lubricates bearings 56 may drain from bearing housings 52, 54 through support housing 32 to a sump 59 (shown only in FIG. 1) of engine 10. For example, the oil draining from bearing housing 52 may drain into one or more integral conduits 62 that extend through support housing 32 to sump 59 of engine 10. The oil draining from bearing housing 54 may pass through a generally horizontal end wall 66 of support housing 32 and drain to the sump of engine 10 via internal passages in engine block 16, as will be described in more detail below.

Bearing housing 52 may be a generally cylindrical, multi-stepped component configured to engage an axial end of support housing 32 (i.e., an end of a semi-cylindrical protrusion 60). Bearing housing 52 may be configured to internally support a compressor end of shaft 42 via bearings 56 at the compressor end, and support shroud 34 at an outer periphery.

In fact, in the disclosed embodiment, bearing housing 52 cooperates with shroud 34 to form a scroll passage 68 that extends from inlet 44 to outlet 46. A diffuser 70 may be disposed within scroll passage 68.

Bearing housing 54 may also be a generally cylindrical, multi-stepped component. Bearing housing 54 may be configured to internally support shaft 42 via bearings 56 at the turbine end, and engage an exterior surface (or first side) 66A of end wall 66 at an outer periphery. Bearing housing 54 may also at least partially house and support a gear train 72. Gear train 72 may facilitate selective operation of turbocharger 30 in a turbocharging mode of operation (i.e., where turbine 28 drives compressor 24 in a conventional manner—described above) or in a supercharging mode of operation, where engine 10 drives compressor 24 via turbine 28. Supercharging may help eliminate lag normally associated with turbocharger operation at varying altitudes, thereby increasing both power and fuel efficiency.

Gear train 72 may be a planetary gear train. A planetary gear train is generally made up of at least three different elements, including a sun gear, a planet carrier having at least one set of planet gears, and a ring gear. The planet gears of the planet carrier mesh with the sun gear and the ring gear. One of the sun gear, planet carrier and ring gear is driven as an input, while another of the sun gear, planet carrier, and ring gear rotates as an output. The sun gear, planet carrier, planet gears, and ring gear can all rotate simultaneously to transmit power from the input to the output at a first ratio of speed-to-torque and in a forward direction or, alternatively, one of the sun gear, planet carrier, and ring gear can be selectively held stationary or locked to rotate with another gear and thereby transmit power from the input to the output at a second ratio of speed-to-torque and/or in a reverse direction. The change in rotational direction and/or speed-to-torque ratio of the planetary gear train depends upon the number of teeth in the sun and ring gears, the gear(s) that is selected as the input, the gear(s) that is selected as the output, and which gear, if any, is held stationary or rotationally locked with another gear. In some embodiments, a hydraulic clutch (also commonly referred to as a brake) is used to hold particular gears stationary and/or to lock the rotation of particular gears together.

In the disclosed embodiment, gear train 72 includes a sun gear 74 that is directly connected to an end of shaft 42 opposite compressor wheel 38, and a plurality of planet gears 76 that orbit and mesh with sun gear 74. Planet gears 76 may also mesh with a stationary ring gear 78 that is located radially outward of planet gears 76. A planet carrier 80 may extend from center axes of planet gears 76 and have formed on an external axle thereof a spur gear 82. Spur gear 82 may extend through a first center opening 83 in end wall 66 to drive an adjacent spur gear 84 (e.g., by way of one or more idler gears 85) that is rotatably supported on a shaft 86. Shaft 86 may extend through a second center opening 88 of support housing 32 to engage corresponding gears (not shown) within engine 10 that are connected to the crankshaft of engine 10. First and second center openings 83, 88 may pass through end wall 66 from exterior surface 66A to an interior surface (or second side) 66B. Second center opening 88 may be located at a position below first center opening 83. A bearing support 90 of gear train 72 may connect to end wall 66 of support housing 32 at interior surface 66B opposite bearing housing 54.

Figure 3:
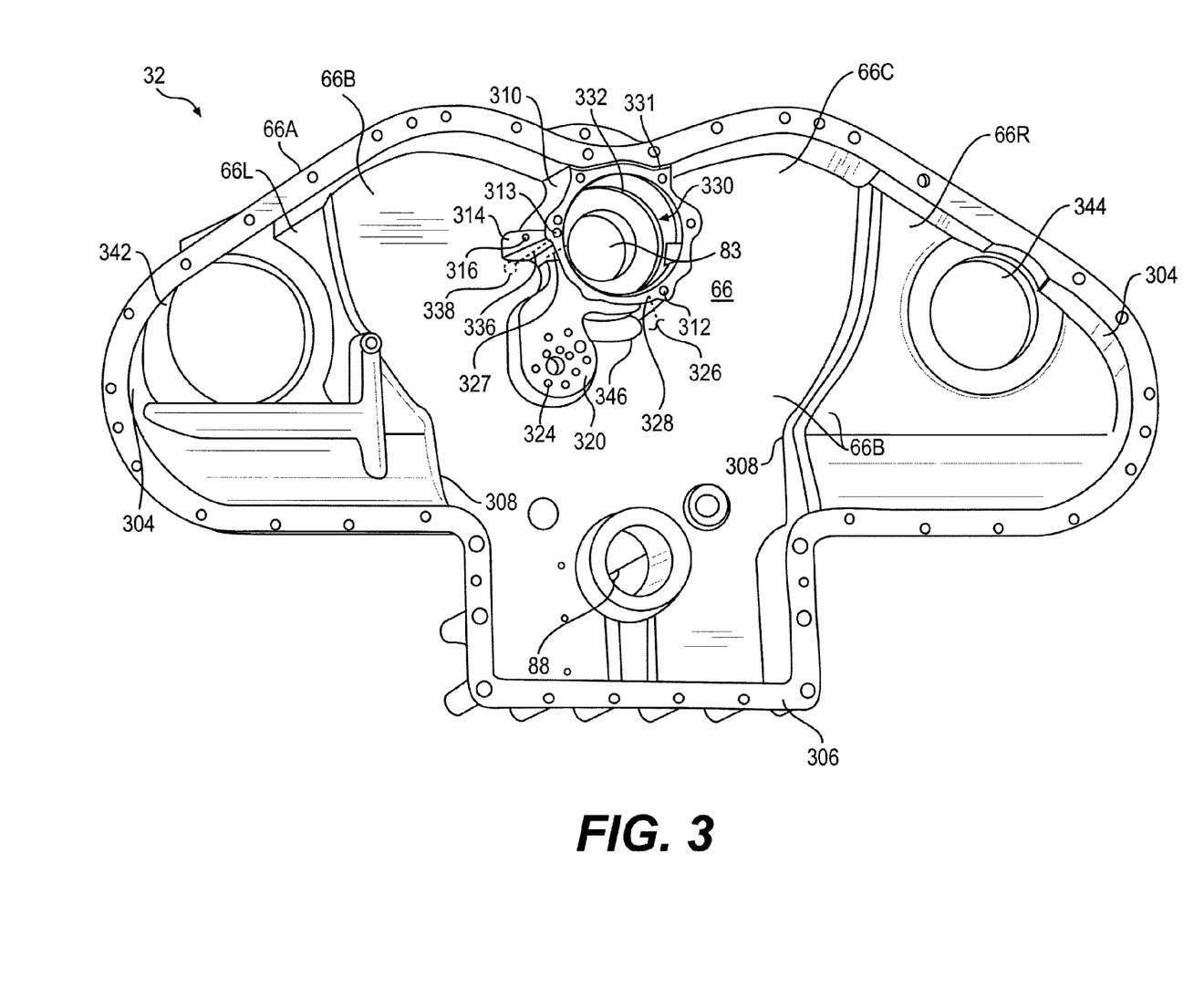
FIG. 3 is a pictorial illustration of an exemplary disclosed turbocharger support housing that may be used in conjunction with the turbocharger of FIG. 2 and the engine of FIG. 1.

As shown in FIG. 3, support housing 32 may be a cast component configured to provide a means of connecting the remaining components of turbocharger 30 to engine 10. In particular, support housing 32 may include end wall 66, semi-cylindrical protrusion 60 protruding from exterior surface 66A of end wall 66, and a plurality of side walls 304 that at least partially surround end wall 66 and protrude from interior surface 66B of end wall 66 in a direction opposite semi-cylindrical protrusion 60. Side walls 304, together with end wall 66, may form a generally hollow enclosure. A mounting flange 306 may be disposed at distal edges of side walls 304 in a generally parallel orientation relative to end wall 66. Mounting flange 306 may be configured to engage an end of engine block 16 (referring to FIG. 1). A plurality of fasteners (not shown) may pass through mounting flange 306 to connect support housing 32 with engine block 16.

End wall 66 of support housing 32 may be generally T-shaped, having a center portion 66C and left- and right-cross portions 66L, 66R, respectively. Support housing 32 may have a depth at center portion 66C that is greater than the depths of left- and right-cross portions 66L, 66R. Accordingly, a step 308 may separate each of left- and right-cross portions 66L, 66R from center portion 66C. Substantially all of center portion 66C may be generally parallel to mounting flange 306, while a gravitationally lower area (with respect to an upright assembled orientation) of left- and right-cross portions 66L, 66R may be sloped toward mounting flange 306 to facilitate draining of lubricating oil from these areas.

A mounting flange 310 may protrude from center portion 66C to facilitate connection of bearing support 90 (referring to FIG. 2) to support housing 32. One or more fasteners and/or dowel pins may pass through mounting flange 310 via mounting holes 312 and be used to connect bearing support 90 to housing 32. Mounting holes 312 may be asymmetrically arranged around mounting flange 310 and usable to mount bearing support 90 to mounting flange 310 properly in only one orientation. Mounting flange 310 may also include an oil discharge port 313 configured to deliver oil to bearing support 90. Mounting flange 310 may include a sidewall 314 having an oil conduit 316 for delivering oil to various components within turbocharger 30.

A mounting face 320 may protrude from center portion 66C at a lower-left edge of mounting flange 310 (as viewed from 66B in FIG. 3). Mounting face 320 may include a plurality of mounting holes 324 configured to engage a shaft of idler gear 85 (referring to FIG. 2). Mounting face 320 may be spaced from end wall 66 a distance less than an extension distance of mounting flange 310 relative to end wall 66, such that a gap 326 is formed between the lower left edge of mounting flange 310 and an upper right edge of mounting face 320. That is, mounting flange 310 may overhang mounting face 320 such that gap 326 is formed therebetween. It should be noted that the lower left edge of mounting flange 310 may alternatively be omitted such that mounting flange 310 is an interrupted, non-continuous surface. That is, in the alternative embodiment, the portion of mounting flange 310 between broken lines 327 and 328 may be omitted.

Support housing 32 may include a stepped bore 330 disposed within end wall 66 at center opening 83 that is generally surrounded by mounting flange 310. A snap-ring groove 332 may be formed within stepped bore 330. A diameter of stepped bore 330 terminating at an end face of mounting flange 310 may have a larger diameter than at exterior surface 66A. A clearance feature 331 may be formed at an assembled gravitationally highest position of mounting flange 310. Clearance feature 331 may be a generally perpendicular side wall of mounting flange 306 that provides clearance for bearing support 90. Support housing 32 may have an oil conduit 336 extending from an inlet 338 in end wall 66 through sidewalls 314 of mounting flange 310 to terminate at oil discharge port 313 (see FIGS. 3 and 6). Oil conduit 316 may be angled inward toward an axial mid-portion of stepped bore 330. Oil conduit 316 may intersect with oil conduit 336.

Center opening 88 may be disposed within a lower area of center portion 66C, below mounting flange 310. Center opening 88 may be generally circular and configured to receive shaft 86 of spur gear 84 (referring to FIG. 2). One or more additional openings (e.g., left and right openings 342, 344) may be disposed within left- and right-cross portions 66L, 66R. Left opening 342 may be configured to provide clearance for the shaft of an auxiliary component (e.g., an alternator, a pump, etc.—not shown) that is driven by engine 10. When the auxiliary component is not connected to support housing 32, left opening 342 may be closed off by way of a cover (not shown) that can be bolted to end wall 66. Right opening 344 may provide clearance and/or mounting for an oil separator (also known as a breather). A drain opening 346 may be disposed within center portion 66C below mounting flange 310 at an upper-right edge of mounting face 320 (as viewed from 66B). Drain opening 346 may allow oil to drain from bearing support 90 and support housing 32 into a crankcase of engine 10.

Figure 4:
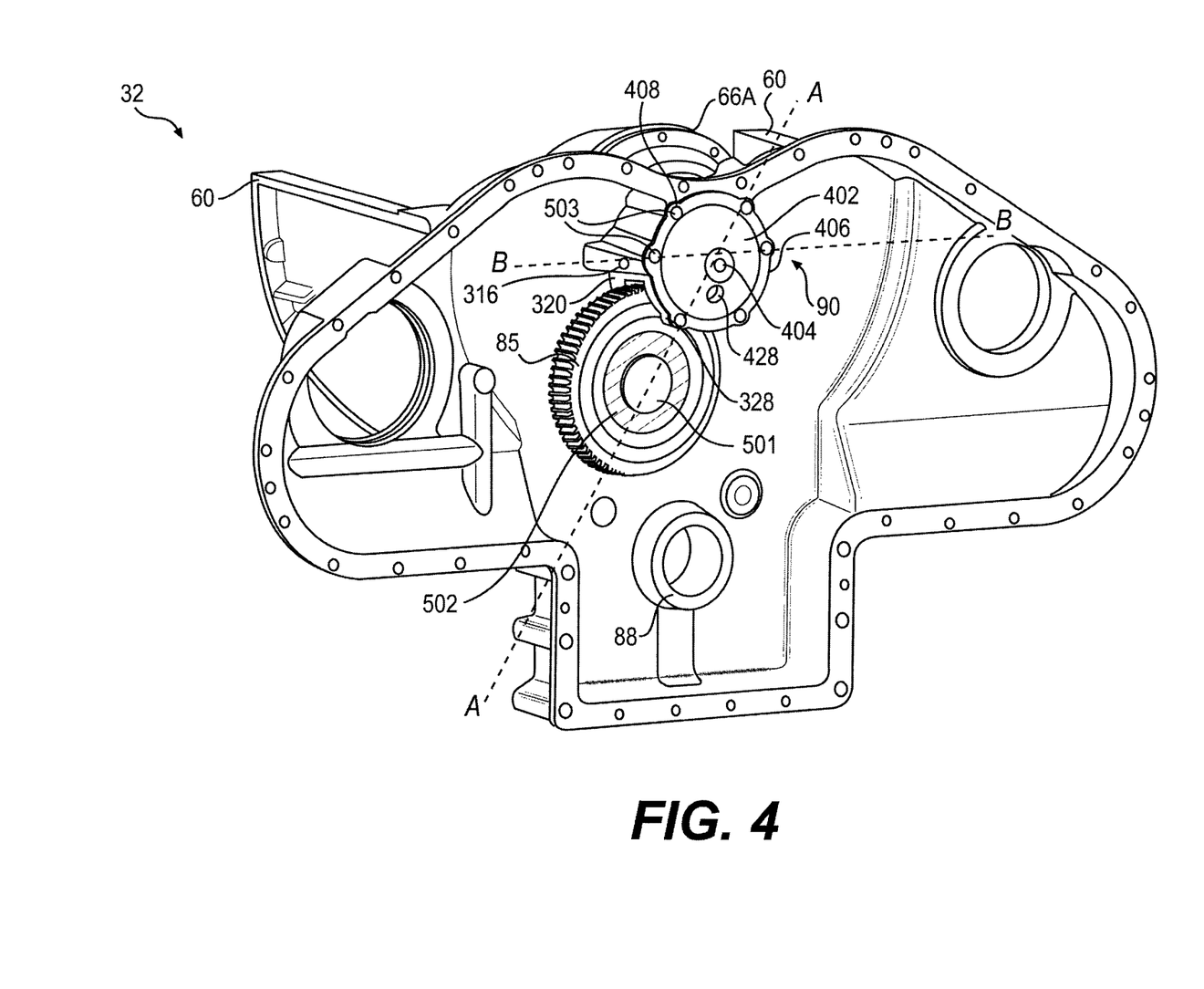
FIG. 4 is a pictorial illustration of an exemplary disclosed turbocharger support assembly having the turbocharger support housing of FIG. 3.
Figure 5:
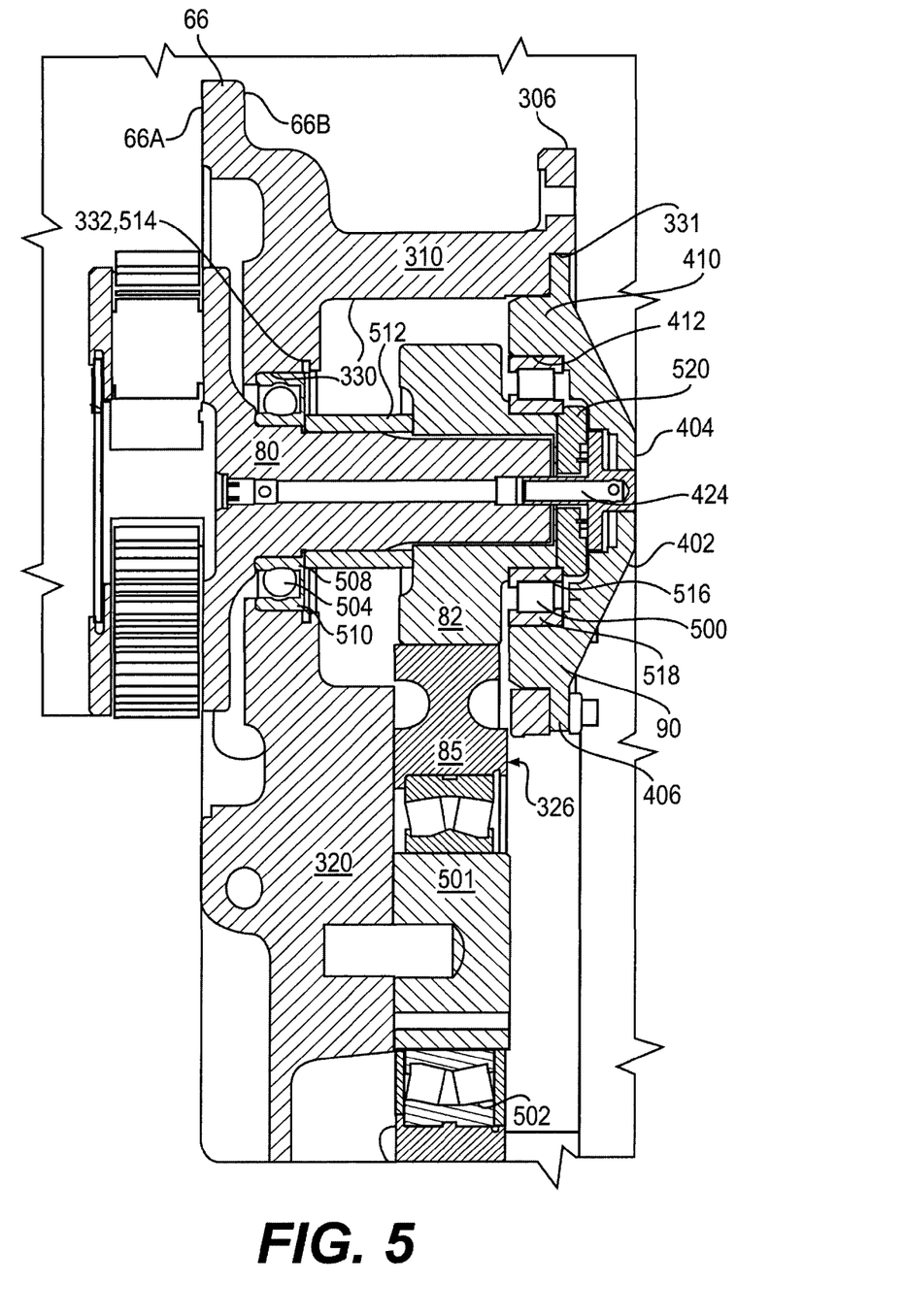
FIG. 5 is a cross-sectional view illustration taken along line A-A of FIG. 4.
Figure 6:
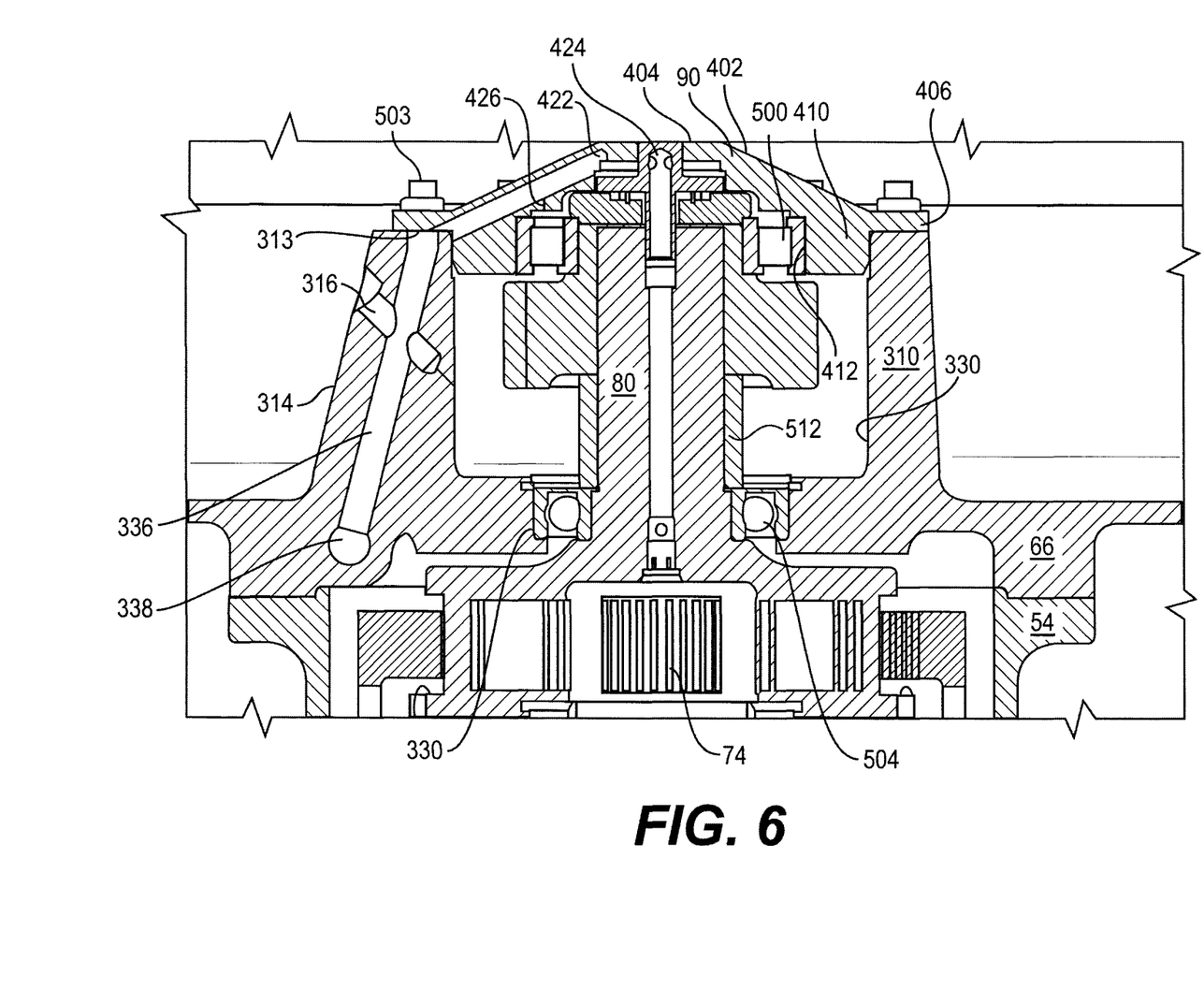
FIG. 6 is a cross-sectional view illustration taken along line B-B of FIG. 4.

As shown in FIGS. 4-6, bearing support 90 may be a cast component configured to provide a means of supporting and providing oil to planet carrier 80 and its associated rotating components. Bearing support 90 may have a generally conical outer surface 402 extending from a tip 404 toward a generally flat annular base 406 that is configured to engage mounting flange 310. A plurality of asymmetrically arranged mounting holes 408 may be located in base 406. Holes 408 may be generally aligned with holes 312 of mounting flange 310. Bearing support 90 may include an annular protrusion 410 extending from base 406 in a direction opposite tip 404. In one exemplary embodiment, annular protrusion 410 may be cylindrical, although another suitable configuration may alternatively be utilized. Annular protrusion 410 may have a smaller outer diameter than base 406, although another suitable arrangement may alternatively be utilized. Bearing support 90 may include a stepped bore 412 having a plurality of shoulders that extends from tip 404 and annular protrusion 410. In one exemplary embodiment, each of the shoulders within stepped bore 412 may have a different diameter.

An oil conduit 422 may be formed within bearing support 90 extending from an intersection of annular base 406 and annular protrusion 410 toward tip 404. Oil conduit 422 may also extend from base 406 to tip 404 at an oblique angle. Oil conduit 422 may communicate with conduit 336 in mounting flange 310 when bearing support 90 is engaged with mounting flange 310. A conduit 424 may extend from conduit 422 at tip 404 toward base 406. Conduit 422 may direct oil from conduit 336 through conduit 424 toward an axial end of planet carrier 80. A conduit 426 may direct oil from conduit 422 toward a bearing 500 mounted within bore 412. Bearing support 90 may also include a drain opening 428 (shown only in FIG. 4) that communicates with an end of bore 412 to drain oil from bearing 500.

Idler gear 85 may be connected to end wall 66 by an idler shaft 501. Idler shaft 501 may be rigidly connected to mounting face 320 via features that engage holes 324 (referring to FIG. 3). A bearing 502 may be located radially between idler gear 85 and idler shaft 501. In this configuration, idler gear 85 may rotate through gap 326.

Bearing support 90 may be configured to support an end of planet carrier 80. In particular, bearing support 90 may be secured to mounting flange 310 by a plurality of fasteners 503, and planet carrier 80 may be disposed within stepped bore 330 at mounting flange 310. Planet carrier 80 may be supported at one end by a bearing 504 that is pressed into stepped bore 330, and at an opposing end by bearing 500 that is pressed into stepped bore 412. Bearing 504 may include an inner race 508 and an outer race 510. Inner race 508 may engage planet carrier 80 on one end and a spacer 512 disposed around planet carrier 80 on an opposite end. Outer race 510 may engage a shoulder of stepped bore 330 on one end and a ring 514 disposed within snap-ring groove 332 on an opposite end. Bearing 500 may likewise include an inner race 516 and an outer race 518. Inner race 516 may engage spur gear 82 on one end and a cap 520 on an opposite end. Cap 520 may engage an interior shoulder of stepped bore 412 and support a lateral end of planet carrier 80. Outer race 518 may be free on one end and engage stepped bore 412 on an opposite end. Conduit 424 may extend through cap 520 and direct oil toward bearings (not shown) associated with planet gears 76. In one exemplary embodiment, the shoulder of stepped bore 412 engaged by outer race 518 of bearing 500 may have a larger diameter and be farther from tip 404 than the shoulder engaged by cap 520.

INDUSTRIAL APPLICABILITY

The disclosed turbocharger support housing may be implemented into any turbocharger and power system application where longevity of the support housing and associated rotating components is an issue. The disclosed turbocharger support housing may help reduce stress on the rotating components by improving assembly alignment. The disclosed turbocharger support housing may also reduce cost by consolidating multiple functionalities into a limited number of components.

During assembly, bearing support 90 may be connected to mounting flange 310 by aligning holes 408 with holes 312. The asymmetric arrangement of holes 312 and 408 may permit only one angular orientation of bearing support 90 with respect to mounting flange 310. Because bearing support 90 may only be mounted to mounting flange 310 in one orientation, the useful life of bearing support 90 may be extended.

Once assembled, an oil pump (not shown) of engine 10 may direct oil toward bearing support 90 through oil conduit 336. From oil conduit 336, oil may be directed toward bearing 500 via conduits 422 and 426, and toward bearing 504 via conduits 336 and 316. Oil may drain to the crankcase of engine 10 via drain openings 428 and 346. The reliable alignment of support housing 32 and bearing support 90 may ensure that bearings 500 and 506 are sufficiently cooled and lubricated.

It will be apparent to those skilled in the art that various modifications and variations can be made to the disclosed bearing support. Other embodiments will be apparent to those skilled in the art from consideration of the specification and practice of the disclosed bearing support. It is intended that the specification and examples be considered as exemplary only, with a true scope being indicated by the following claims and their equivalents.

What is claimed is:

1. A bearing support for a turbocharger assembly, comprising:
   a cylindrical body with a tip end, a base end, and a conical outer surface extending from the tip end to the base end;
   an annular protrusion extending from the base end in a direction away from the tip end;
   a stepped bore formed within the cylindrical body and passing from the tip end through the annular protrusion;
   a first conduit disposed within the cylindrical body and extending from an intersection of the annular protrusion and the base end of the cylindrical body toward the tip end; and
   a second conduit extending from the first conduit toward a shoulder inside the stepped bore.

2. The bearing support of claim 1, further including an axial third conduit extending from the first conduit at the tip end toward the base end.

3. The bearing support of claim 1, further including a plurality of asymmetrically arranged mounting holes disposed within the base end.

4. The bearing support of claim 1 wherein the stepped bore has a greater diameter at the base end than at the tip end.

5. The bearing support of claim 1, wherein an outer diameter of the annular protrusion is less than an outer diameter of the base end.

6. The bearing support of claim 1, further including a drain opening extending from the conical outer surface toward the stepped bore.

7. The bearing support of claim 1, wherein the first conduit is oriented at an oblique angle relative to an axis of the stepped bore.

8. A bearing support for a turbocharger assembly, comprising:
   a cylindrical body with a tip end, a base end, and a conical outer surface extending from the tip end to the base end;
   a stepped bore formed within the cylindrical body and passing from the tip end to the base end;
   an annular protrusion extending from the base end in a direction away from the tip end; and
   a plurality of asymmetrically arranged mounting holes disposed within the base end.

9. The bearing support of claim 8, wherein the stepped bore has a greater diameter at the base end than at the tip end.

10. The bearing support of claim 8, wherein an outer diameter of the annular protrusion is less than an outer diameter of the base end.

11. The bearing support of claim 8, further including a drain opening extending from the conical outer surface into the stepped bore.

12. A turbocharger assembly, comprising:
   a turbocharger having a turbine wheel, a compressor wheel, a shaft connecting the turbine and compressor wheels, a first bearing housing supporting a compressor end of the shaft, and a second bearing housing supporting a turbine end of the shaft;
   a support housing connected to the turbocharger, the support housing having:
      an end wall having a first side engaged with the first and second bearing housings, and a second side;
      a center opening disposed in the end wall and passing from the first side to the second side;
      a mounting flange located around the center opening and extending from the second side of the end wall in a second direction;
      a discharge port located at a face of the mounting flange; and
      a first conduit extending from the end wall through the mounting flange and terminating at the discharge port; and
   a bearing support having:
      a cylindrical body with a tip end, a base end connected to the mounting flange, and a conical outer surface extending from the tip end to the base end;
      an annular protrusion extending from the base end into the center opening;
      a stepped bore formed within the cylindrical body and passing from the tip end through the annular protrusion;

a second conduit in fluid communication with the first conduit in the support housing and extending from an intersection of the annular protrusion and the base end of the cylindrical body toward the tip end;

a plurality of asymmetrically arranged mounting holes disposed within the base end; and a plurality of fasteners passing through the mounting holes in the base end of the bearing support and into the mounting flange.

13. The turbocharger assembly of claim 12, wherein the first conduit is oriented at an oblique angle relative to an axis of the stepped bore.

14. The turbocharger assembly of claim 12, wherein the support housing further includes a side wall adjacent to the mounting flange that engages the base end of the bearing support to position the bearing support relative to the support housing.

15. The turbocharger assembly of claim 12, wherein the center opening is a stepped bore having a greatest diameter at the mounting flange.

16. The turbocharger assembly of claim 15, further including:

a gear train disposed within the stepped bore of the support housing; and a first bearing pressed into the stepped bore of the bearing support to support the gear train.

17. The turbocharger assembly of claim 16, wherein the bearing support further includes a third conduit extending from the second conduit toward a shoulder inside the stepped bore, the third conduit configured to direct oil toward the first bearing.

18. The turbocharger assembly of claim 16, wherein the bearing support further includes a fourth conduit extending from a center of the tip end toward the base end, the fourth conduit configured to direct oil toward the gear train.

19. The turbocharger assembly of claim 16, further including a second bearing pressed into the stepped bore of the support housing, the second bearing supporting a second end of the gear train.

\* \* \* \* \*